T. B. LEE.
WATER TURBINE.
APPLICATION FILED DEC. 22, 1908.

962,364.

Patented June 21, 1910.
7 SHEETS—SHEET 5.

Witnesses:
Jas. E. Hutchinson
A. E. Hutchinson

Inventor:
Thomas B. Lee,
By Royal E. Burnham, Attorney.

T. B. LEE.
WATER TURBINE.
APPLICATION FILED DEC. 22, 1908.

962,364.

Patented June 21, 1910.
7 SHEETS—SHEET 6.

UNITED STATES PATENT OFFICE.

THOMAS B. LEE, OF CHARLOTTE, NORTH CAROLINA.

WATER-TURBINE.

962,364.  Specification of Letters Patent.  Patented June 21, 1910.

Application filed December 22, 1908. Serial No. 468,723.

*To all whom it may concern:*

Be it known that I, THOMAS B. LEE, a citizen of the United States, residing at Charlotte, in the county of Mecklenburg and State of North Carolina, have invented certain new and useful Improvements in Water-Turbines, of which the following is a specification, reference being had therein to the accompanying drawings.

This invention relates to fluid motors, including those adapted to be actuated by water under pressure.

There is embodied in the machine a spiral terminal of a feeder-conduit so constructed as to deliver the actuating fluid to the driving element in the proper manner to produce the highest efficiency.

The invention also contemplates the provision of a novel form of rotor or wheel having two series of buckets so arranged that the actuating fluid engaging the rotor is smoothly divided by abutments between the buckets and diverted evenly to each side into each series of buckets, the fluid flowing at approximately right angles to the rotor-shaft when it strikes the abutments, and the buckets being of such shape as to give it then an axial movement and then a movement parallel and in opposite direction to the inflowing fluid, by which time its entire force has been exerted on the rotor. The tendency of the actuating fluid in one series of buckets to impart axial movement to the rotor in one direction is counterbalanced by its tendency in the other series to impart axial movement in the opposite direction, whereby end thrust is avoided.

Each series of bucket-blades is provided with a centrally-arranged abutment which passes entirely around the rotor and under which the fluid passes during its axial movement in the buckets. Forming a running joint with each of these abutments is a partition which divides the inflowing fluid under pressure from the spent fluid passing out of the buckets on the other side. The abutments and partitions not only aid in determining the path of fluid in the buckets and eliminate static pressure on the rotor, but they also brace the bucket-blades at places intermediate the abutments thereof where great strain is exerted.

Associated with the feeder-conduit and rotor are guide-blades arranged to properly direct fluid to the rotor and carrying movable gates of novel construction, whereby delivery of fluid to the rotor is controlled, and whereby a proper opening to the rotor is maintained at all positions of adjustment, with the result of good action on the rotor by the fluid.

The invention provides for the gates an easily-operable and conveniently-accessible controlling mechanism of novel construction and arrangement.

The rotor-casing is formed with end-heads which may be easily disconnected to give access to and permit removal of the rotor when desired, and on one of these heads the actuating devices of the mechanism for controlling the gates are mounted. The lateral portions of the rotor-casing are constructed in a novel manner conducive of strength and of properly supporting the spiral terminal of the feeder-conduit.

When read in connection with the description herein, the details of construction and arrangement of parts contemplated by this invention will be apparent from the accompanying drawings, forming part hereof, wherein an embodiment of the invention as applied to a hydraulic motor is disclosed, for purposes of illustration.

Like reference-characters refer to corresponding parts in the several views of the drawings, of which—

Having more particular reference to the drawings, 15 designates a foundation, support, or casing member, wherein, or constituting which, is a draft or exhaust conduit 16 leading from the machine. A member 17, forming the base of the machine, is bolted, or otherwise suitably secured, to member 15.

Rising from each side of base member 17 and extending over the machine at each end are casing-plates 18, forming in conjunction with a feeder-conduit terminal 19 the sides of the casing of the machine. Formed at or near the outer edge of each casing-plate is a flange 20, to which flanges are attached end cover-plates or heads 21. The heads carry centrally-arranged outwardly-extending stuffing-boxes and bearings 22 in an easily-accessible position, wherein is journaled a drive-shaft 23, which carries within the casing a rotor or bucket element 24. The inner edges of casing-plates 18, above base member 17, are extended outwardly to form flanges 25, and these flanges extend at the bottom through base member 17 to form complete rings disposed entirely around the rotor.

The feeder-conduit terminal 19 leading to the casing is in spiral form, and it gradually diminishes in size around the casing and through the draft-conduit until the material of its outer convolution meets the lower material of its entrance portion where an inwardly-extending lip 26 is formed. The portion of the terminal surrounding and adjacent to the casing is open between the two flanges or rings 25, to which the material of the terminal is attached or with which it is made integral, whereby the terminal is secured to and supported on the machine. Attached to and extending inwardly from rings 25 are annular partition abutments or rings 27 extending entirely around the rotor.

Figure 1:
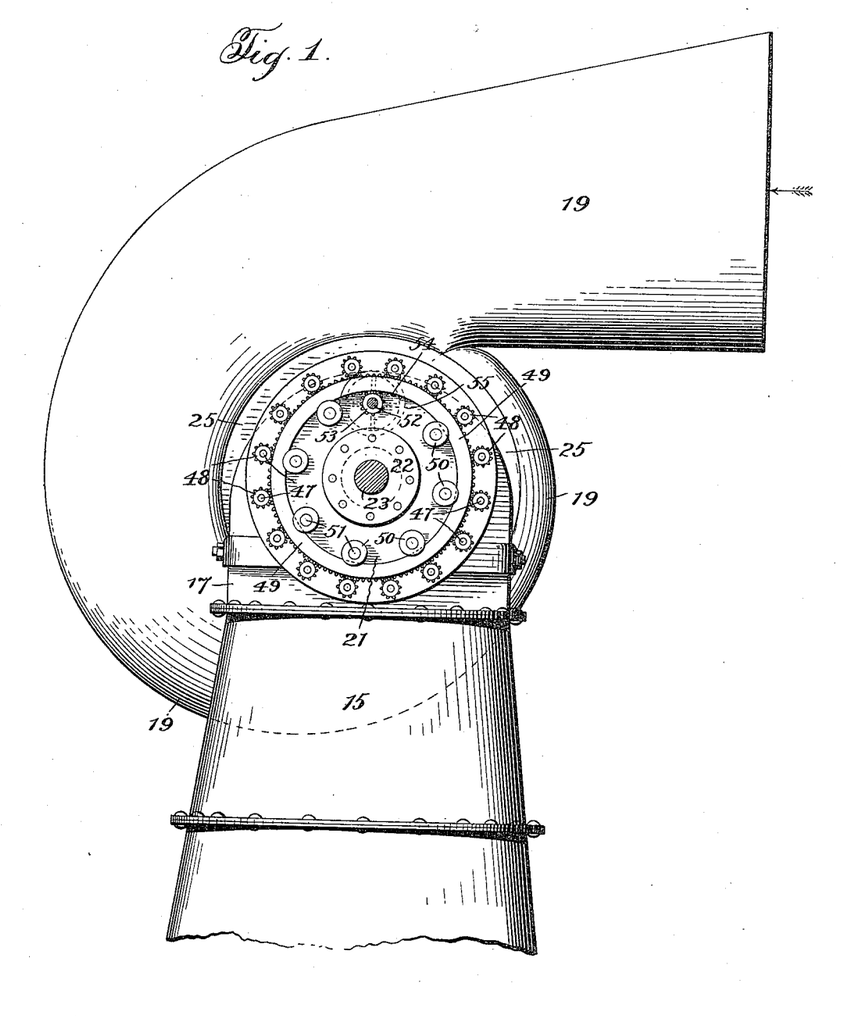
Figure 1 is an elevation of the control side of the machine.
Figure 2:
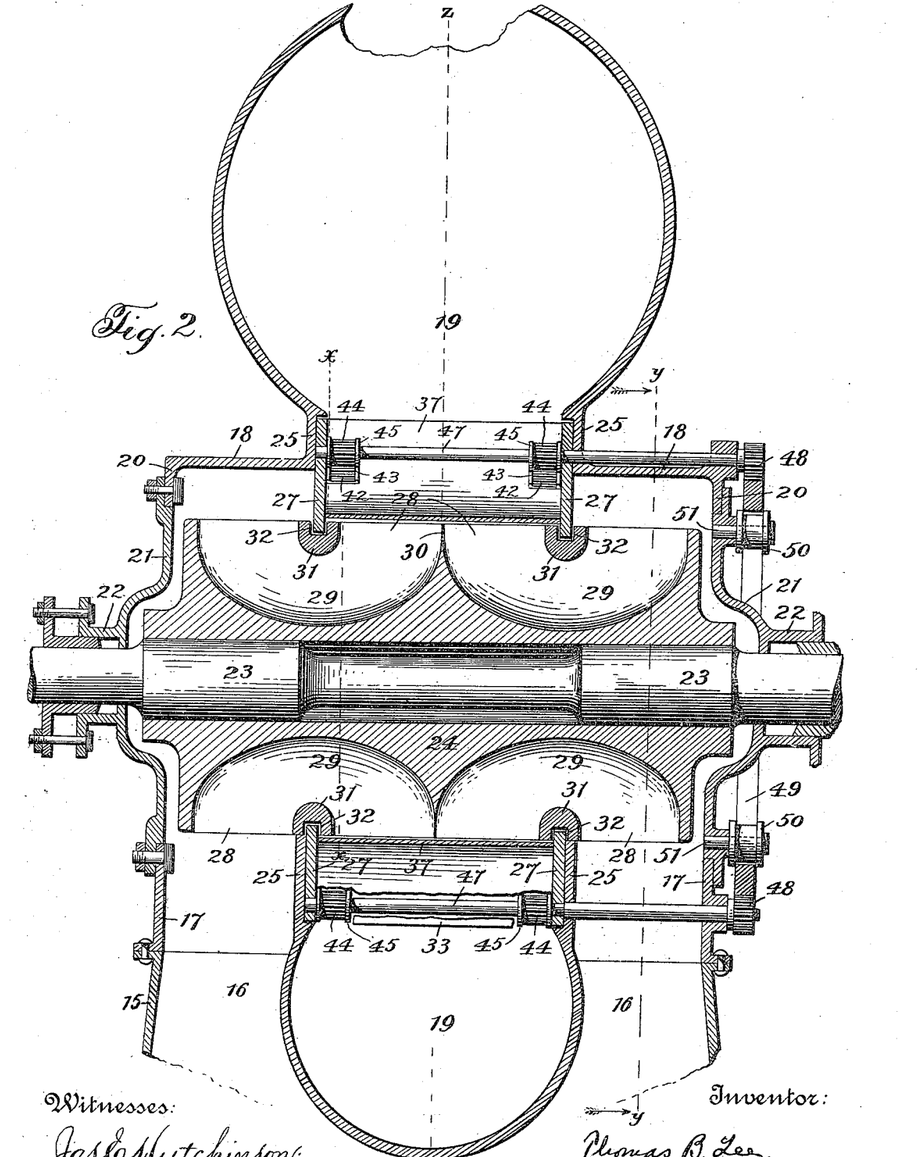
Fig. 2 is a central section taken longitudinally of the drive-shaft.
Figure 3:
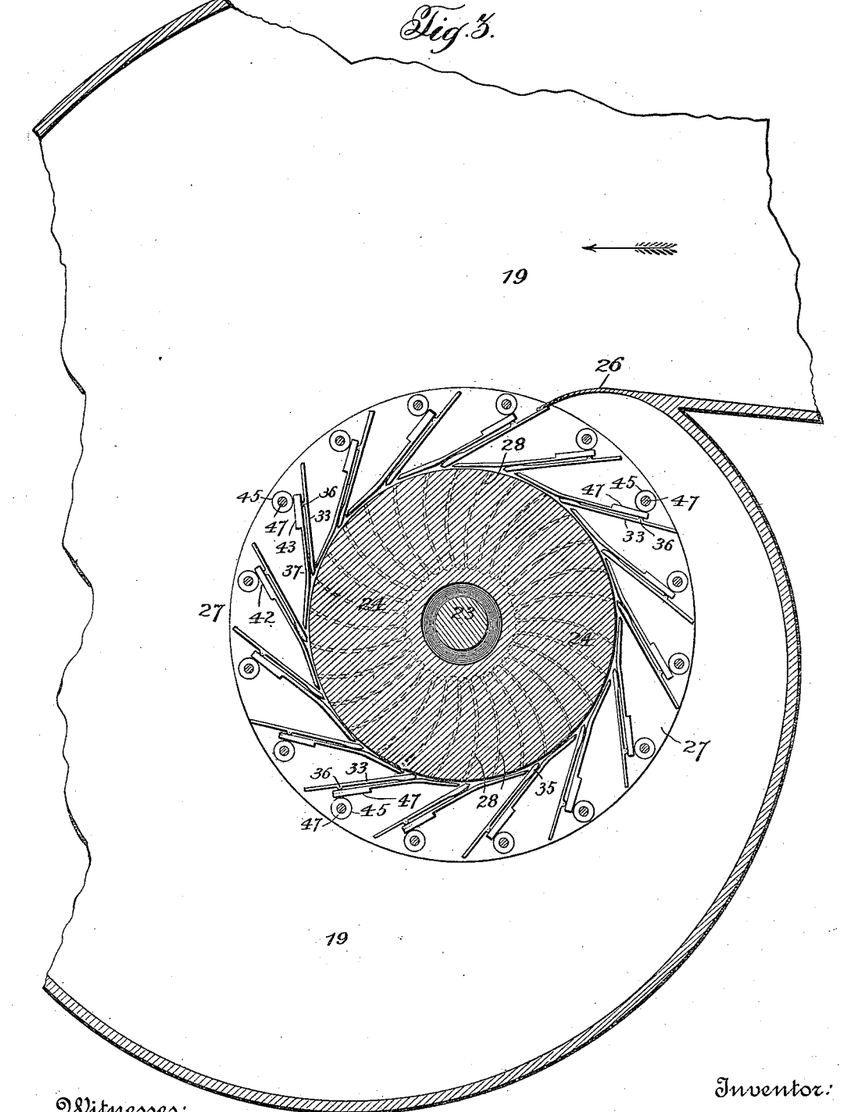
Fig. 3 is a section on the line $z$—$z$, Fig. 2.
Figure 4:
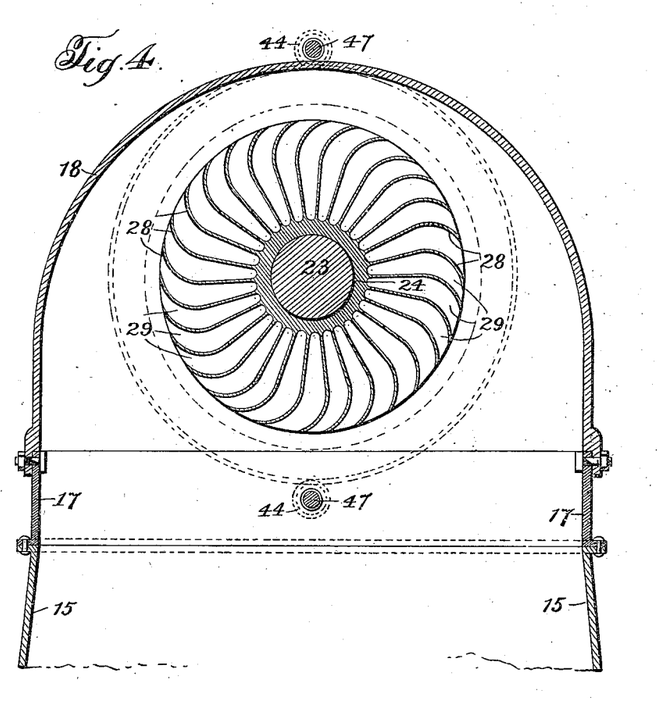
Fig. 4 is a section on the line $y$—$y$, Fig. 2.
Figure 5:
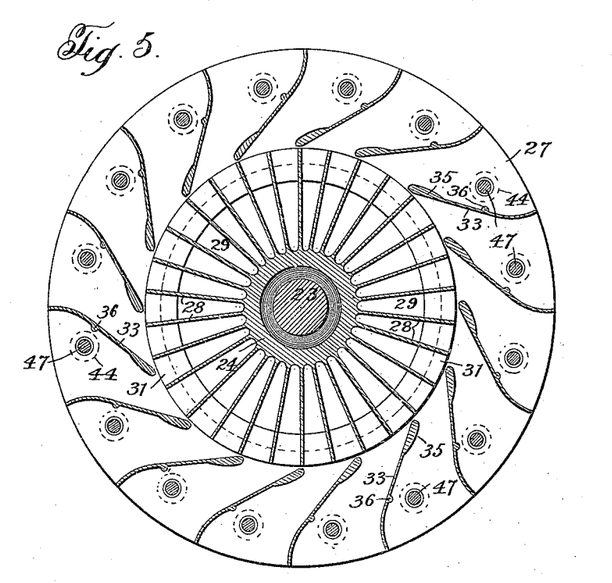
Fig. 5 is a section on the line $x$—$x$, Fig. 2.
Figure 6:
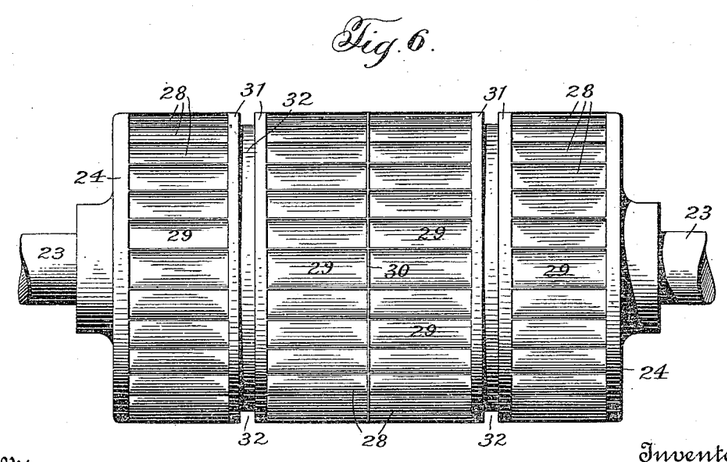
Fig. 6 is a view of the rotor.

The rotor 24 is provided with duplicate series of blades 28 forming buckets 29 which are separated by an annular sharp central abutment 30. Attached centrally to the periphery of each series of blades is an annular abutment or ring 31 having an exterior annular groove 32 therein, into which rings 27 project and form therewith running joints sufficiently loose to permit free rotation of the rotor and sufficiently tight to obviate all, or nearly all, static leakage therethrough. In this manner partitions are provided between the inner or receiving sides of the buckets and the outer or discharging ends. The two series of buckets formed in the rotor are so placed as to equally receive fluid from the peripheral opening from the feeder-conduit terminal, the fluid in its radial movement against the rotor being smoothly divided by the sharp abutment 30 and being directed by the curve of the bucket formation axially under the partitions formed by rings 27 and 31 and then radially in a direction opposite to that of entrance, by which time its force is spent and it flows out through exhaust-passages between the partitions, rotor, and casing-plates 18 and down into draft-conduit 16. It will be seen that the casing is sufficiently removed from the rotor on the discharge ends to permit the free flow of spent fluid radially therefrom, that the rotor is not only impelled by the flow of the fluid thereinto but also by its discharge therefrom, and that there is no energy wasted by axial discharge or leakage between the buckets and a casing of the type that engages all of the peripheral edges of the buckets except at the place of entrance. The axial impulse of the fluid in the two series of buckets being in opposite directions, all axial thrust on the rotor is avoided.

Figures 9, 10, 11, 12, 13:
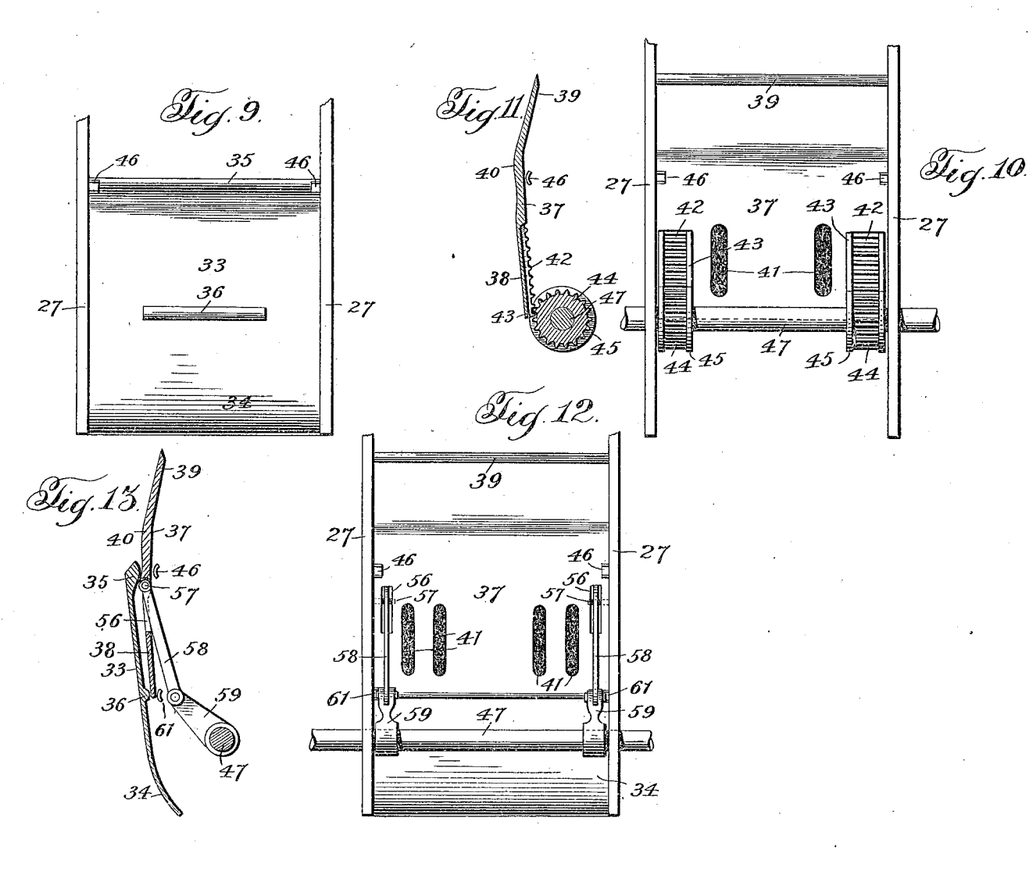
Fig. 9 is a plan view of a guide-blade.
Fig. 10 is a plan view illustrative of the rack movement type of gate control.
Fig. 11 is a section thereof.
Fig. 12 is a plan view illustrative of the link movement type of gate control.
Fig. 13 is a section thereof.
Figure 14:
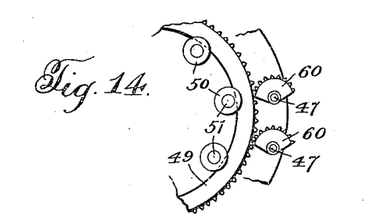
Fig. 14 is a fragmentary view of the control side of the machine illustrative of the actuating parts of the link type of gate control.

To conduct fluid from the feeder-conduit at a proper angle into the abutting sides of the buckets separated by the abutment 30, guide-blades 33 are radially arranged about the rotor with their inner edges just clearing the bucket-blades, and they have disposition in secant lines approaching the rotor in the direction of its rotation, whereby the actuating fluid is deflected into the buckets in that direction. These blades 33 extend across the full width of the peripheral opening of the feeder-conduit terminal from one ring 27 to the other, and they are terminally attached to and supported by these rings. They are formed with curved outer ends 34, to prevent the sharp separation of entering water, thus making an easier entrance between the blades. Each guide-blade at its inner end is formed with a protuberance or ridge 35 extending entirely thereacross, and intermediate its inner and outer ends with a somewhat similar protuberance or ridge 36 which does not extend to its edges. These protuberances or ridges may be made solid or in the form of anti-friction rollers.

Carried by each guide-blade is a regulator-gate 37, which is a plate of the full width of the opening of the feeder-conduit terminal to the rotor, and it rests upon the protuberances 35 and 36. Its outer portion 38 engages the blade-protuberances 36, it is movable thereon, and has disposition generally parallel with the second line of the blade. The inner portion 39 of the gate is deflected in direction of rotation of the rotor in such manner that it lies in a line substantially tangential thereto when closed. A rib or protuberance 40 is formed on the back face of portion 39. Each gate is formed with perforations 41 to relieve undue pressure of actuating fluid thereon.

On each side of every gate, on the face opposite to its guide-blade, is a longitudinally-disposed rack 42 having blank longitudinal portions or lateral edges 43. A pinion 44 meshes with each rack, and it has a peripheral blank portion or on each side of its teeth blank rims 45 which engage the blank portion of the rack. While water pressure will tend to keep a gate against its guide-blade, engagement of the blank portions of the pinion and rack will also prevent lifting of the gate and reliably maintain it in position against the protuberance 36 of the guide-blade thereunder. In order, also, to hold the gate upon the inner blade-protuberance 35, lugs 46 project from rings 27 and engage the gate at places opposite to that protuberance.

Pinions 44 are carried by shafts 47 journaled in rings 25 and 27 and in the flange 20 of one of the casing-plates 18, there being one shaft for every pair of pinions. At their ends beyond flange 20 the shafts 47 are provided with spur-pinions 48. To actuate shafts 47 an exteriorly-toothed ring 49 is positioned in mesh with the spur-pinions. This ring is supported and held in place by flanged rollers 50, which engage the inner periphery thereof, and which are journaled on studs 51 projecting from the casing-head. Journaled in and projecting from the head is a regulator-shaft 52, carrying a pinion 53, in mesh with a rack 54, formed in the inner periphery of ring 49 between two of the rollers. On the outer end of shaft 52 is a wheel 55, whereby the shaft may be manually rotated, or the shaft may be equipped with some other suitable element associated with an automatic governor for having rotation imparted to it.

Instead of the regulator-gates 37 being provided with racks 41 and pinions 44 in mesh therewith, the gates may be formed with slots 56 near the side edges. Inserted through the slots from the edges of the gates are pins 57, on which are pivoted links 58, which latter are pivotally connected to arms 59 on the shafts 47. Slots 56 are sufficiently long to permit the free movement of the links. The outer protuberance 36 of a guide-blade on each end is stopped short of the sides, as already described, in order that it may not interfere with the movement of any part of the link that may project through the slot. In this case, also, segmental racks 60 would be substituted for the spur-pinions 48 in mesh with the ring 49. In this form, too, lugs 61 would project from rings 27 and engage the regulator-gates opposite to the outer protuberances 36, these studs performing the function of the racks and pinions in holding the gates in position on the blades and being used in addition to the lugs 46.

It will be apparent that the actuating fluid flows from the spiral feeder-terminal into the spaces between the guide-blades carrying the regulator-gates to the rotor. In order to prevent any fluid from making successive revolutions around the series of blades and gates, the lip 26 is connected to the guide-blade nearest thereto, or it may be formed integral therewith, whereby an effective stop is formed.

To regulate the flow of fluid between the guide-blades to the rotor, the shaft 52 is rotated, either by hand or by a governor, and thus the ring 49 which simultaneously rotates the shafts 47 through the instrumentality of the spur-pinions 48 or segmental racks 60, as the case may be. Upon rotation of shafts 47, the regulator-gates 37, through the instrumentality of racks 42 and pinions 44 or of the links 58 and arms 59 as the case may be, will be simultaneously moved toward or from the rotor to close or open them, dependent upon direction of rotation of the shafts. When rotation is in proper direction to open the gates, they recede outwardly from the rotor along the guide-blades. In their closed approximately tangental position adjacent to the rotor, the inner protuberances 35 of the guide-blades engage the protuberances 40 to maintain this position; and, as the gates recede from the rotor the first movement is approximately tangential until their protuberances pass off the protuberances 35, when the inner portions of the gates assume positions alongside of and have movement more nearly parallel to the inner portions of the blades. By the time the opening movement is completed, the outer ends of the gates will have accommodated themselves behind the curved outer ends of the guide-blades, by which they are protected and by which their projection into the path of the inflowing fluid is avoided. It will thus be seen that, as the gates are housed closely against the guide-blades when in open position, they offer no interference to the passage of fluid between the guide-blades. Also, as the first movement of the gates in opening is approximately tangential to the rotor, the gates are permitted to remain close thereto with their directing-edges in position to properly divert the fluid into the buckets when the gates are partly open. When rotation of shafts 47 is in a direction opposite to that just described, the gates are closed or partly closed, dependent upon duration of rotation of the shafts, with a movement the reverse of that described.

Figure 7:
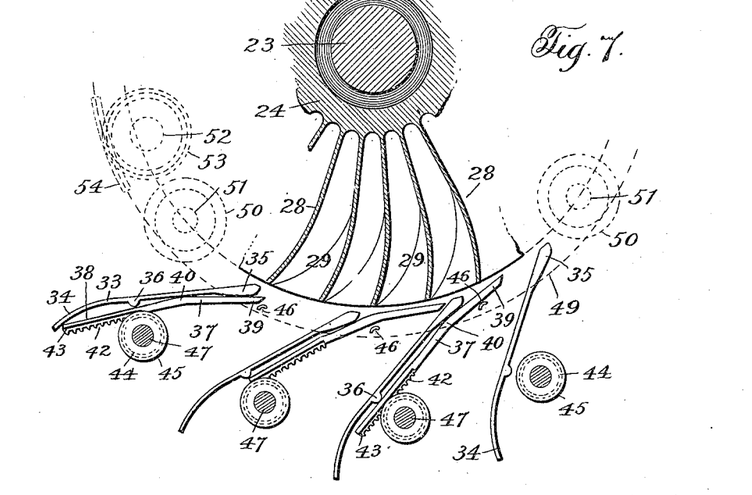
Fig. 7 is a fragmentary view illustrative of a rack movement type of gate control.
Figure 8:
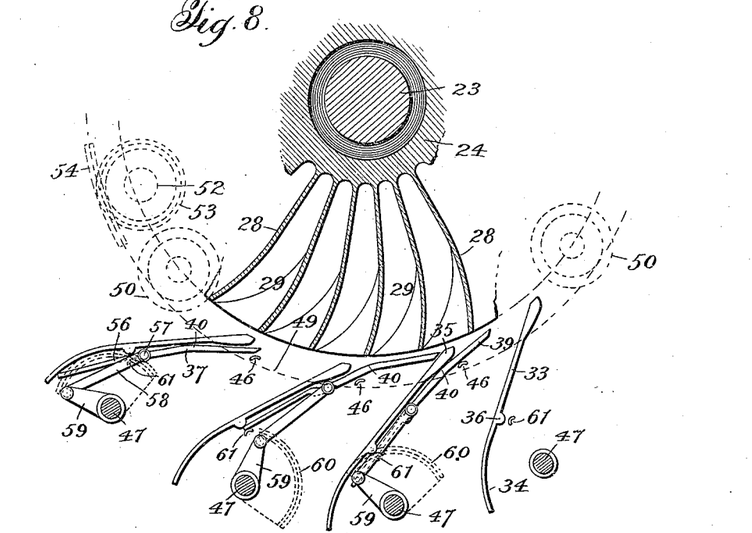
Fig. 8 is a fragmentary view illustrative of a link movement type of gate control.

The several gates shown in Figs. 7 and 8 are in the different positions of closed, partly closed, and open. It is manifest, of course, that all the gates at one time have the same relative positions with respect to the guide-blades and rotor, and the delineation of these figures is merely for the purpose of illustrating the different positions assumed by the gates under different conditions.

The details of construction and arrangement of parts shown and described herein are merely for the exposition of the principles of the invention, and it is to be understood that it is not the intention to be necessarily limited to such details and arrangements in the interpretation of the claims hereinafter, as many changes and alterations may obviously be made without in the least departing from the nature and spirit of the invention.

Having thus described my invention, what I claim as new, and desire to secure by Letters Patent, is—

1. In a fluid-motor, a rotor, guide-blades disposed in secant positions with respect to the rotor and arranged to direct fluid thereto, gates to control passage of fluid between the guide-blades longitudinally movable with respect to the blades toward and from the rotor and arranged to assume secant positions with respect to the rotor when withdrawn therefrom, operating means for the gates, and means operable to cause the gates in movement toward the rotor to approach tangential position with respect thereto.

2. In a fluid-motor, a rotor, guide-blades disposed in secant positions with respect to the rotor and arranged to direct fluid thereto, gates to control passage of fluid between the guide-blades longitudinally movable with respect to the blades toward and from the rotor and arranged to assume secant positions with respect to the rotor when withdrawn therefrom, operating means for the gates, and means coöperating between the gates and blades to cause the gates in movement toward the rotor to approach tangential position with respect thereto.

3. In a fluid-motor, a rotor, guide-blades arranged to direct fluid to said rotor and each having a protuberance at its inner end, a gate carried by each guide-blade and having a protuberance arranged to engage its guide-blade protuberance, and means operable to move said gates in one direction to cause engagement of said protuberances and the gates to close the entrances between said guide-blades and to move the gates in the opposite direction to open the entrances.

4. In a fluid-motor, a rotor, guide-blades arranged to direct fluid to the rotor, gates to control passage of fluid to the rotor having portions deflected in direction of rotation of the rotor, operating means for the gates, and means causing the deflected portions of the gates to assume secant positions with respect to the rotor when in withdrawn position and to approach tangential position in movement toward the rotor.

5. In a fluid-motor, a rotor, guide-blades arranged to direct fluid to the rotor and formed with curved outer ends, a longitudinally-movable gate carried by each guide-blade and arranged to be moved inwardly to close the entrances between said guide-blades and to be moved outwardly to open said entrances and to take position with their outer ends behind the curved outer ends of said guide-blades, and means whereby said gates are moved longitudinally.

6. In a fluid-motor, a rotor, guide-blades arranged to direct fluid to the rotor, each guide-blade being formed with transverse protuberances, a gate engaging the protuberances of each guide-blade, and means whereby said gates are longitudinally moved to open and close the entrances between said guide-blades.

7. A fluid-motor comprising a casing having a peripheral opening therein, a feeder-conduit arranged to deliver fluid through said opening into the casing, a rotor in said casing, partitions extending from each side of said opening and around the rotor, guide-blades on said partitions and arranged to direct fluid to the rotor, gates on said guide-blades and operable longitudinally to open and close the entrances between said guide-blades, and projections on said partitions engaging said gates to maintain them in position on said guide-blades.

8. In a fluid-motor, a rotor, guide-blades arranged to direct fluid to the rotor, a longitudinally-movable gate on a guide-blade, a rack on the gate, a shaft disposed transversely of the gate, a pinion on the shaft in mesh with the rack and maintaining the gate in position against the guide-blade, and means whereby said shaft is rotated.

9. In a fluid-motor, a rotor, guide-blades arranged to direct fluid to the rotor, a longitudinally-movable gate on each guide-blade, a rack on each gate having a blank longitudinal portion, a pinion in mesh with each rack and having a blank peripheral portion in engagement with the blank longitudinal portion of the rack, shafts carrying the pinions, and means whereby said shafts are rotated.

10. In a fluid-motor, a casing having a peripheral opening therein, a feeder-conduit arranged to deliver fluid through said opening into the casing, a rotor in said casing, partitions extending from each side of said opening and around the rotor, guide-blades carried by said partitions and arranged to direct fluid to the rotor, a gate on each guide-blade, a shaft for each gate journaled in said partitions, means operatively connecting each gate at a side to a shaft, and means whereby said shafts are rotated.

In testimony whereof I affix my signature in presence of two witnesses.

THOMAS B. LEE.

Witnesses:
W. T. LEE,
B. HUTCHISON.